United States Patent [19]
Durand

[11] Patent Number: 5,764,182
[45] Date of Patent: Jun. 9, 1998

[54] POLARIMETRICAL PROCESSING DETECTION CIRCUIT FOR RADAR RECEIVER

[75] Inventor: Jean-Claude Durand, Viroflay, France

[73] Assignee: Thomson-CSF, Paris, France

[21] Appl. No.: 678,539

[22] Filed: Jul. 5, 1996

[30] Foreign Application Priority Data

Jul. 7, 1995 [FR] France .................. 95 08237

[51] Int. Cl.⁶ ............................................. G01S 7/34
[52] U.S. Cl. ..................................... 342/188; 342/93
[58] Field of Search ................... 342/188, 93, 160, 342/162

[56] References Cited

U.S. PATENT DOCUMENTS

| | | | |
|---|---|---|---|
| 3,599,208 | 8/1971 | Nelson | 342/92 |
| 4,242,682 | 12/1980 | Musha et al. | 342/93 |
| 4,323,899 | 4/1982 | Barnes et al. | 342/90 |
| 4,573,054 | 2/1986 | Bouko et al. | 343/786 |
| 4,774,520 | 9/1988 | Bouko et al. | 343/783 |
| 4,940,988 | 7/1990 | Taylor, Jr. | 342/93 |
| 5,499,030 | 3/1996 | Wicks et al. | 342/93 |
| 5,504,487 | 4/1996 | Tucker | 342/90 |

FOREIGN PATENT DOCUMENTS 39 07 788   9/1990   Germany .
2 265 515   9/1993   United Kingdom .

*Primary Examiner*—John B. Sotomayor
*Attorney, Agent, or Firm*—Oblon, Spivak, McClelland, Maier & Neustadt, P.C.

[57] ABSTRACT

This target detection polarimetrical processing circuit comprises, in parallel, a polarimetrical CFAR detector provided with a target detection output, a polarimetrical clutter-rejection filter associated with a CFAR detector provided with a target detection output and a bank of polarimetrical filters associated with CFAR detectors provided with target detection outputs, and an "OR" type logic circuit combining the different target detection outputs and a selection circuit activating the polarimetrical clutter-rejection filter and disabling the bank of polarimetrical filters when the degree of polarization of the clutter exceeds a certain threshold and conversely disabling the polarimetrical clutter-rejection filter and activating the bank of polarimetrical filters when the degree of polarization of the clutter is below said threshold. The circuit makes use of the complementary features of the polarimetrical clutter-rejection filter, the polarimetrical CFAR detector and a bank of polarimetrical filters to carry out an optimal target detection whatever the degree of polarization of the clutter, the signal-to-clutter ratio and the instantaneous polarization of the target echo.

5 Claims, 6 Drawing Sheets

POLARIMETRICAL PROCESSING DETECTION CIRCUIT FOR RADAR RECEIVER

BACKGROUND OF THE INVENTION

1. Field of the Invention

The present invention pertains to operations for the polarimetrical processing of the reception signal of a radar with a view to improving the sensitivity of detection of targets.

2. Description of the Prior Art

In order to improve the sensitivity of detection of targets in radar technology, it has been proposed to take the polarization of the back-scattered field into consideration, either by using radar receivers having two parallel channels with horizontal and vertical crossed polarizations or right-hand and left-hand circular crossed polarizations, or by using transmitters that transmit simultaneously or successively in two orthogonal polarizations with modulation encoding operations to separate the transmitted signals and seek out the polarization having the optimum signal-to-noise ratio.

In these techniques using polarimetrical radars, there are two reception channels available, A and B, in two orthogonal polarizations on which there are available complex video signals $Z_A$ and $Z_B$ resulting from the standard operations, conducted in parallel in both channels, of frequency transposition, matched filtering and possibly frequency processing which may be Doppler or MTI (mobile target indication) processing.

The first step of the usual polarimetrical processing operations always consists of the assessment, made in one way or another, of the degree of polarization and the type of polarization of the resolution cell tested (the range and speed gate taken into consideration) and its environment. This assessment is done, for each resolution cell, by determining the components of the Stokes vector $\vec{G}$ with four real components $g_0, g_1, g_2, g_3$ that are defined by the expressions:

$$g_0 = |Z_A|^2 + |Z_B|^2$$

$$g_1 = |Z_A|^2 - |Z_A|^2$$

$$g_2 = Z_B \cdot Z_A^* + Z_B^* \cdot Z_A = 2 \cdot Re(Z_B \cdot Z_A^*) \text{ (Re: real part)}$$

$$g_3 = \frac{Z_B \cdot Z_A^* - Z_B^* \cdot Z_A}{i} = 2 \cdot Im(Z_B \cdot Z_A^*) \text{ (Im: imaginary part)}$$

the component $g_0$ representing the energy of the received signal and the components $g_1$, $g_2$ and $g_3$, normed by the component $g_0$ representing the coordinates of a vector whose modulus p:

$$p = \sqrt{\frac{g_1^2 + g_2^2 + g_3^2}{g_0^2}}$$

represents the degree of polarization and whose orientation in the Poincaré sphere represents the type of polarization. If the reception channel A is a left-hand circular polarization and the reception channel B is a right-hand circular polarization, the coordinate $g_2$ defines a diameter on the Poincaré sphere that is oriented positively towards the point of the equator corresponding to a horizontal polarization and negatively towards the point of the equator corresponding to a vertical polarization and the coordinate $g_1$ defines another diameter of the Poincaré sphere orthogonal to the preceding one, oriented positively towards the polar point corresponding to a left-hand circular polarization and negatively towards the polar point corresponding to a right-hand circular polarization. The location, further within the interior of the Poincaré sphere or further away from the interior of the Poincaré sphere, of the point with coordinates $g_1, g_2, g_3$ normed by the component $g_0$, gives the degree of polarization. The closer the point is to the surface of the sphere, the greater is this degree of polarization.

The polarimetrical environment of the clutter is assessed by determining the components of the Stokes vector in the resolution cells neighboring the resolution cell under analysis for the target detection. These components are determined either along the distance axis if the operation relates to the mobile echoes selected by Doppler processing or along the temporal axis, from antenna rotation to antenna rotation, in the case of a map of clutter designed for the detection of slow targets or targets seen athwart, and the average of the components is taken.

To reveal the echoes of the polarimetrical environment of the clutter, there are essentially three known techniques. These are the techniques of:

the polarimetrical rejection filter, the bank of polarimetrical filters, and the polarimetrical CFAR (constant false alarm rate) detector.

A polarimetrical filter carries out a linear combination of the complex signals $Z_A$ and $Z_B$ received on the two orthogonally polarized ports of the receiver of the radar. In this operation, the antenna is provided with a virtual reception polarization ê that is tuneable at will by action on the complex coefficients of the linear combination chosen: the signal Z at output from the filter is none other than the component of the incident field along the axis of polarization defined by ê. By using the Stokes vector $\vec{H}$ with components $[g_0, g_1, g_2, g_3]$ corresponding to the back-scattered field in the resolution cell under analysis and by assigning the notations $[1, \alpha, \beta, \gamma]$ to the components of the unitary Stokes vector $\vec{H}$ corresponding to the polarization defined by ê, it can be shown that the energy of the signal at output of a polarimetrical filter corresponds to the scalar semi-product F of the vector $\vec{G}$ multiplied by the vector $\vec{H}$:

$$F = \frac{\vec{H}\vec{G}}{2} \text{ or again } F = \frac{1}{2}(g_0 + \alpha \cdot g_1 + \beta \cdot g_2 + \gamma \cdot g_3)$$

This output signal energy is extracted by a modulus extraction circuit processing the components in phase and in quadrature of the complex output signal of the polarimetrical filter, as happens when there is no polarimetrical filter. It is compared with a detection threshold set as a function of the requisite probability of a false alarm $P_{fa}$, to detect the presence of a target.

A polarimetrical filter taken in isolation, quite like a mono-polarization antenna, has a "blind" polarization: an echo with a polarization orthogonal to that of the filter or to that of the antenna, whatever its intensity, does not give rise to any signal at output. Depending on the viewpoint adopted, whether it is sought to eliminate spurious signals or detect targets, this may be an advantage or a drawback.

To obtain a polarimetrical rejection filter, it is enough to choose a polarization ê for the polarimetrical filter that is orthogonal to the estimated polarization of the clutter. If $[g_{f0}, g_{f1}, g_{f2}, g_{f3}]$ are the components of the Stokes vector $\vec{G}_f$ of the clutter which are, as seen here above, the mean components of the Stokes vectors of the back-scattered field in the resolution cells neighboring the cell under analysis, and if $p_f$ is the degree of polarization of the clutter:

$$p_f = \sqrt{\frac{g_{f1}^2 + g_{f2}^2 + g_{f3}^2}{g_{f0}^2}}$$

This amounts to adopting the following values for components of the unitary Stokes vector $\vec{H}$ of the polarimetrical rejection filter:

$$\vec{H} = \begin{bmatrix} 1 \\ -\frac{g_{f1}}{g_{f0} \cdot p_f} \\ -\frac{g_{f2}}{g_{f0} \cdot p_f} \\ -\frac{g_{f3}}{g_{f0} \cdot p_f} \end{bmatrix}$$

since two orthogonal polarizations are represented on the Poincaré sphere at two diametrically opposite points.

The mean energy $F_f$ at output of the polarimetrical filter for a resolution cell containing only clutter is then equal to:

$$F_f = \frac{1}{2} \left( g_{f0} - \frac{g_{f1}^2}{g_{f0} \cdot p_f} - \frac{g_{f2}^2}{g_{f0} \cdot p_f} - \frac{g_{f3}^2}{g_{f0} \cdot p_f} \right)$$

which can also be written:

$$F_f = \frac{1}{2} (1 - p_f) g_{f0}$$

This energy is minimal and corresponds to half of the energy of the non-polarized component of the clutter for this energy of the non-polarized component is equally distributed between the polarization ê of the filter and the orthogonal polarization.

In an environment of non-polarized clutter ($p_f=0$), a polarimetrical rejection filter is inoperative and the residual energy of the clutter then becomes independent of the choice of the filtering polarization ê and reaches half of the total energy conveyed by the two ports of the antenna. The usefulness of the polarimetrical rejection filter increases with the degree of polarization of the clutter. However, the polarimetrical rejection filter has the drawback of being blind to the targets that back-scatter a field having the same polarization as the clutter.

A bank of polarimetrical filters consists of a parallel grouping of several polarimetrical filters with permanently fixed polarizations, chosen so as to be evenly distributed on the Poincaré sphere, each of these polarimetrical filters being followed by a modulus extractor and a CFAR or constant false alarm rate detector. In addition, the bank of polarimetrical filters includes an "OR" type logic circuit combining the outputs of the different detectors and performing the logic merger of the detections, namely the elementary presence of targets.

The totalizing of the cases of detection or elementary presence of targets performed by the different detectors is equivalent to the selection of the polarimetrical filter that gives the optimum signal-to-clutter ratio while a polarimetrical rejection filter only minimizes the level of clutter. The bank of polarimetrical filters is thus an approximate embodiment of the "matched polarimetrical filter". The greater the number of polarimetrical filters used and the greater the extent to which they give a representative and dense sampling of the space of the polarizations, the better is the approximation.

As the degree of polarization of the clutter increases, the matched polarimetrical filter tends to be merged with the polarimetrical rejection filter. This fact can be understood easily by taking the extreme case of the entirely polarized clutter ($p_f=1$) for which the residual energy of the clutter at output of the polarimetrical rejection filter is zero and the signal-to-clutter ratio is infinite.

A bank of polarimetrical filters is therefore well suited to types of clutter with little or medium polarization. Furthermore, it is also appropriate for weak useful echoes. However, since the residue of clutter at output of a polarimetrical rejection filter is very sensitive to the precise adjustment of the "blind" polarization to the polarization of the clutter, it can be seen that, in a highly polarized environment, a bank of polarimetrical filters makes for a cumbersome solution. For, with the need to ensure a sufficiently fine meshing of Poincaré sphere polarizations, the bank must contain a large number of filters.

Conceptually, the polarimetrical CFAR detector has the following elements: a base-changing circuit acting on the vector signal, whose components are the signals $Z_A$, $Z_B$ present at the two reception ports of the radar, to express this vector signal with two new components $E_P$ and $E_Q$ in the base of the inherent polarizations P and Q of the clutter (polarizations parallel and orthogonal to that of the clutter), two weighting circuits that are each positioned on one output channel of the base-changing circuit and carrying out a $1/\sqrt{\lambda}$ and $1/\sqrt{\mu}$ weighting respectively, conversely proportional to the square root of the estimated energy of the clutter in the channel considered, P and Q respectively, two modulus extraction circuits, one summation circuit connected to the output of the two modulus extraction circuits and one CFAR detector.

The base-changing circuit is formed by two polarimetrical filters, one with the polarization of the clutter and the other with a polarization orthogonal to that of the clutter, the latter filter being then a polarimetrical clutter-rejection filter. The parameter $\lambda$ that plays a part in the weighting of the channel coming from the polarimetrical filter with the polarization of the clutter is proportional to the estimated energy of the clutter at output of this polarimetrical filter:

$$\lambda = \frac{1}{2}(1 + p_f)$$

for the unitary Stokes vector $\vec{L}$ of this polarimetrical filter with polarization identical to that of the clutter has the following components:

$$\vec{L} = \begin{bmatrix} 1 \\ g_{f1}/g_{f0} \cdot p_f \\ g_{f2}/g_{f0} \cdot p_f \\ g_{f3}/g_{f0} \cdot p_f \end{bmatrix}$$

and the mean energy of the clutter at output of this filter verifies:

$$\frac{1}{2} \vec{L}\vec{G} = \frac{1}{2}(1 + p_f) g_{f0}$$

The weighting parameter p for its part is equal to:

$$\mu = \frac{1}{2}(1 - p_f)$$

since it has been seen that the mean energy of clutter at output of a polarimetrical filter with polarization orthogonal to the clutter is equal to:

$$\frac{1}{2}(1-p_f)g_{f0}$$

At outputs of the weighting circuits, the incident polarized clutter is converted into a non-polarized phenomenon. A processing operation of this kind does not give rise to any blind polarization. Provided that it is strong enough, a target echo having the same polarization as the clutter may be detected for it appears on the processing channel P. It can be shown in fact that the polarimetrical CFAR detector is optimal for the high signal-to-clutter ratios. Besides, unlike in the case of the rejection filter, this processing remains efficient in a non-polarized environment.

In short, the efficiency of the polarimetrical processing operations that are known depends on the degree of polarization of the clutter and the energy of the useful echo. This means that there is no processing operation that is optimal in all cases of clutter.

SUMMARY OF THE INVENTION

The present invention is aimed at overcoming this drawback.

An object of the invention is a target detection polarimetrical processing circuit for radar receivers comprising at least, in parallel, a polarimetrical CFAR detector provided with a target detection output and a polarimetrical clutter-rejection filter associated with a CFAR detector provided with a target detection output, and an "OR" type logic circuit combining the target detection outputs of the polarimetrical CFAR detector and of the CFAR detector.

Advantageously, the target detection polarimetrical processing circuit comprises, in parallel, a polarimetrical CFAR detector provided with a target detection output, a polarimetrical clutter-rejection filter associated with a CFAR detector provided with a target detection output and a bank of polarimetrical filters associated with CFAR detectors provided with target detection outputs, and an "OR" type logic circuit combining the different target detection outputs and a selection circuit activating the polarimetrical clutter-rejection filter and disabling the bank of polarimetrical filters when the degree of polarization of the clutter exceeds a certain threshold and conversely disabling the polarimetrical clutter-rejection filter and activating the bank of polarimetrical filters when the degree of polarization of the clutter is below said threshold.

BRIEF DESCRIPTION OF THE DRAWINGS

Other characteristic and advantages of the invention shall emerge from the following description of an embodiment given by way of an example. This description shall be made with reference to the drawings, of which.

MORE DETAILED DESCRIPTION

Figure 1:
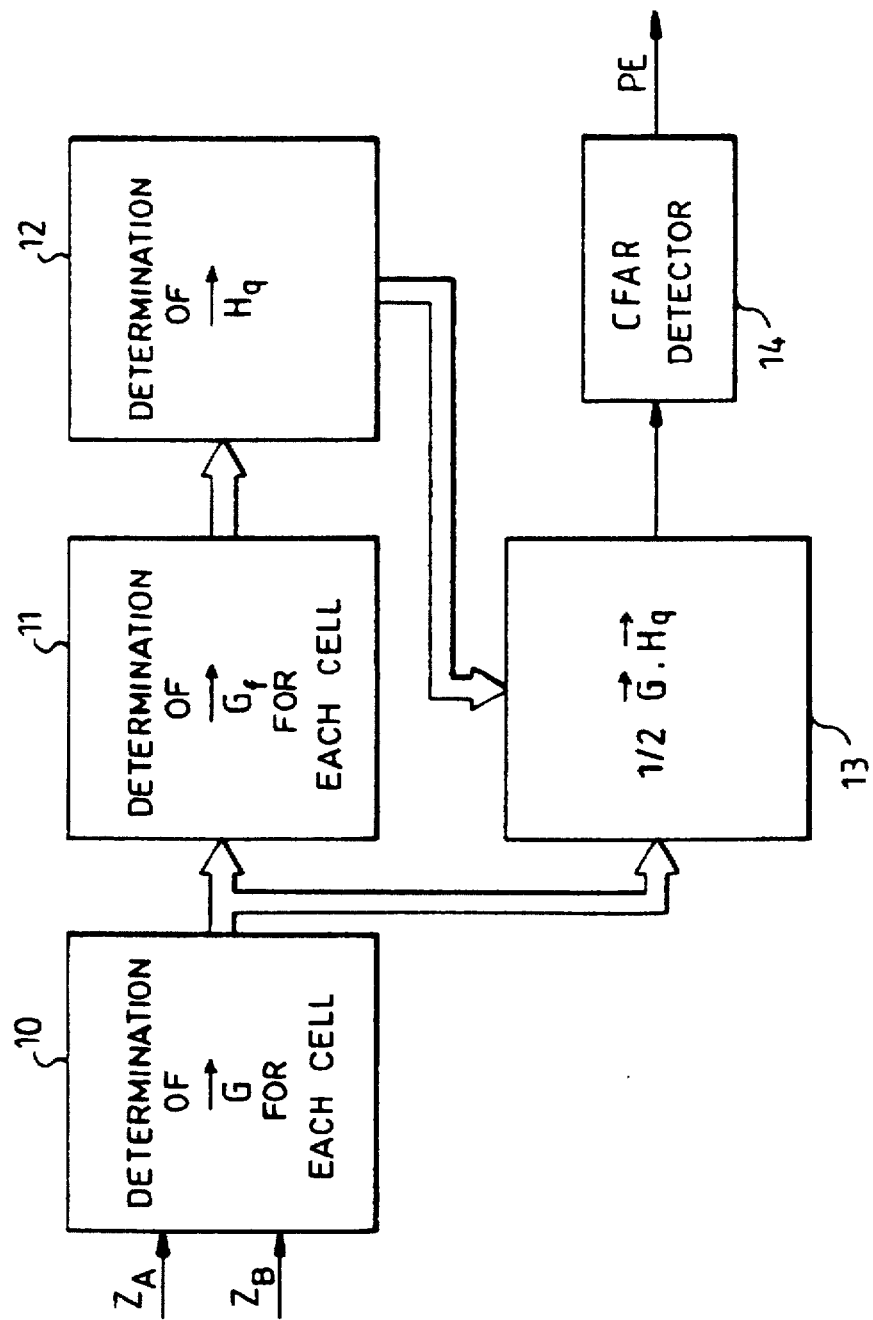
FIG. 1 gives a schematic view of a processing circuit carrying out the function of a polarimetrical clutter-rejection filter positioned upline with respect to a CFAR detector.

The polarimetrical processing circuit of FIG. 1, which carries but the function of a polarimetrical clutter-rejection filter positioned upline with respect to a CFAR detector comprises the following elements at input: a circuit 10 for determining components of the Stokes vector $\vec{G}$ for each resolution cell of the radar, followed by a circuit 11 for determining components of the Stokes vector $\vec{G}_f$ of the clutter surrounding each resolution cell of the radar, a circuit 12 for determining components of the unitary Stokes vector $\vec{H}_Q$ of the polarization orthogonal to that of the clutter, a circuit 13 for computing the scalar product $\frac{1}{2}\vec{G}.\vec{H}_Q$ and a CFAR detector 14.

The circuit 10 for determining the components of the Stokes vector $\vec{G}$ for each resolution cell of the radar works on the basis of the complex video signals $Z_A$ and $Z_B$ available on the two crossed polarization reception channels of the radar and determines the components $[g_0, g_1, g_2, g_3]$ of the Stokes vector $\vec{G}$ by implementing the relationships of definition:

$$\begin{cases} g_0 = |Z_A|^2 + |Z_A|^2 \\ g_1 = |Z_A|^2 - |Z_A|^2 \\ g_2 = Z_B \cdot Z_A{}^* + Z_B{}^* \cdot Z_A = 2 \cdot Re(Z_B \cdot Z_A{}^*) \text{ (Re: real)} \\ g_3 = \dfrac{Z_B \cdot Z_A{}^* + Z_B{}^* \cdot Z_A}{i} = 2 \cdot Im(Z_B \cdot Z_A{}^*) \text{ (Im: imaginary part)} \end{cases} \quad (1)$$

The circuit 11 for determining the components of the Stokes vector $\vec{G}_f$ of the clutter surrounding each resolution cell determines the components $[g_{f0}, g_{f1}, g_{f2}, g_{f3}]$ of the Stokes vector $\vec{G}_f$ of the clutter in establishing the mean components of the Stokes vector $\vec{G}$ of the resolution cells surrounding the resolution cell under analysis for the target detection.

The circuit 12 for determining the unitary Stokes vector $\vec{H}_Q$ of the polarization orthogonal to that of the clutter determines the components $[1, \alpha, \beta, \gamma]$ of the Stokes vector $\vec{H}_Q$ on the basis of the relationships:

$$\begin{cases} \alpha = -\dfrac{g_{f1}}{g_{f0} \cdot p_f} \\ \beta = -\dfrac{g_{f2}}{g_{f0} \cdot p_f} \quad \text{with} \quad p_f = \sqrt{\dfrac{g_{f1}^2 + g_{f2}^2 + g_{f3}^2}{g_{f0}^2}} \\ \gamma = -\dfrac{g_{f3}}{g_{f0} \cdot p_f} \end{cases}$$

The circuit 13 for the computation of the scalar product delivers, for each resolution cell examined, a real signal representing a energy value of echo received in a polarization orthogonal to that of the clutter and therefore fulfils the role of a polarimetrical rejection filter. This signal which has the value:

$$\tfrac{1}{2}\vec{G}.\vec{H}_Q = g_0 + \alpha \cdot g_1 + \beta \cdot g_2 + \gamma \cdot g_3$$

is subjected to the CFAR detector 14, of standard construction, generating a target detection binary signal PE.

As indicated here above, a circuit of this kind with a polarimetrical rejection filter is optimal in the case of highly polarized clutter but inefficient in the presence of non-polarized clutter and blind to targets having the same polarization as the clutter.

Figure 2:
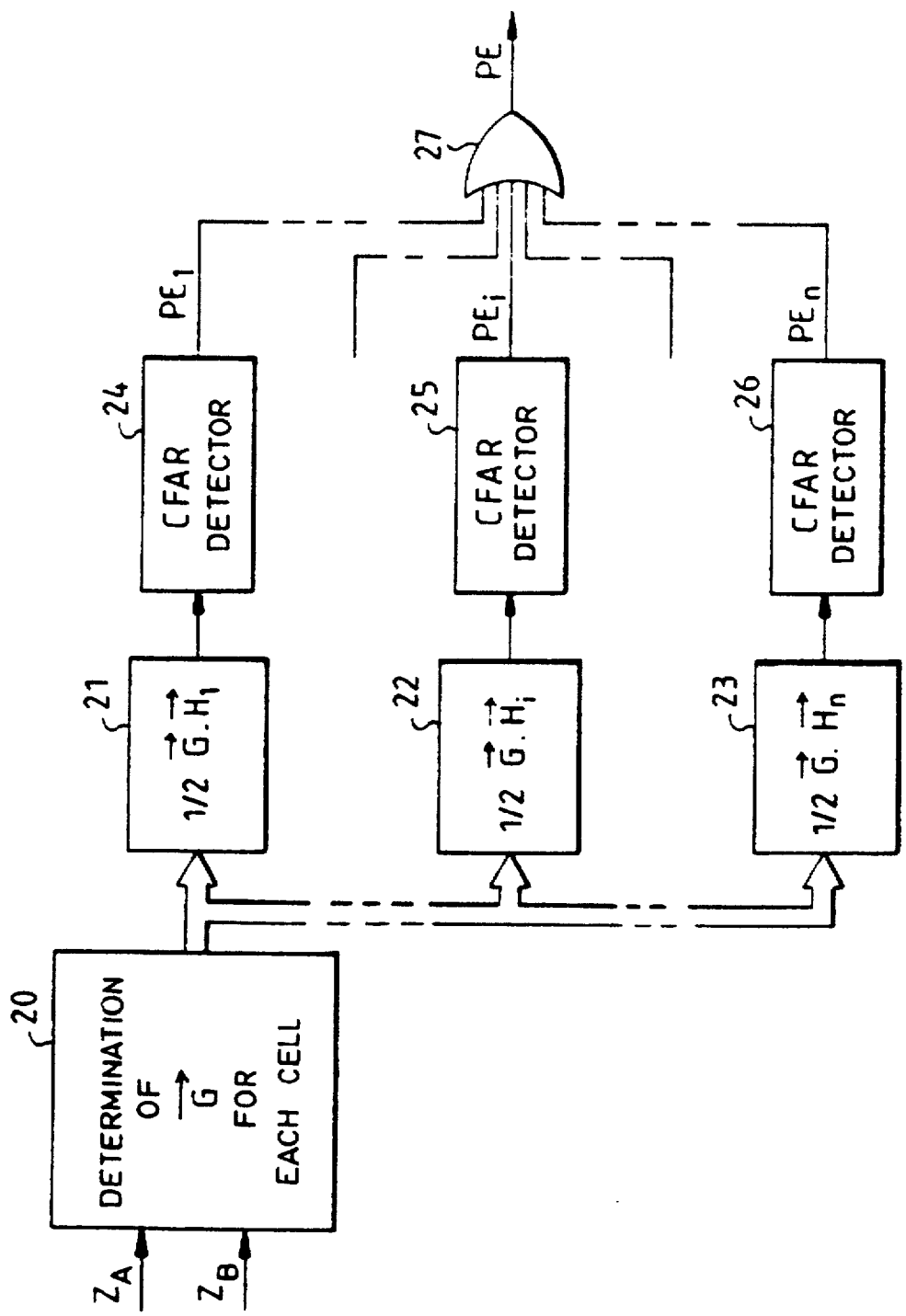
FIG. 2 gives a schematic view of another processing circuit carrying out the function of a bank of polarimetrical filters associated with CFAR detectors whose outputs are coupled by an "or" type logic circuit.

The polarimetrical processing circuit of FIG. 2 which carries out the function of a bank of polarimetrical filters associated with CFAR detectors whose outputs are coupled by an "OR" type logic circuit comprises the following elements: a circuit 20 for determining the components of the Stokes vector $\vec{G}$ for each resolution cell of the radar, followed by several circuits 21, 22, 23 for computing the scalar product with unitary Stokes vectors $\vec{H}_i$ corresponding to various directions of polarization evenly distributed on the Poincaré sphere, CFAR detectors 24, 25, 26 connected individually to the outputs of the scalar product computation circuits 21, 22, 23 and an "OR" type logic circuit 27 combining the target detection outputs of the different CFAR detectors 24, 25, 26.

The circuit 20 for determining the components $[g_0, g_1, g_2, g_3]$ of the Stokes vector $\vec{G}$ is similar to the circuit 10 of FIG. 1 and proceeds by means of the same relationships of definition (1).

The scalar product computation circuits 21, 22, 23 are similar to the circuit 11 of FIG. 1 but, unlike this circuit 11, they operate with permanently fixed unitary Stokes vectors $\vec{H}_i$ that are chosen once and for all in such a way as to correspond to polarizations evenly distributed on the Poincaré sphere. They generate signals representing the echo energy received in different polarizations sampling the different types of polarization possible and play the role of a bank of polarimetrical filters.

The CFAR detectors 24, 25, 26, which are of standard construction, generate a binary target detection signal, depending on the crossing or non-crossing of their thresholds which are adjusted for a constant false alarm rate.

The "OR" type logic circuit 27 combines the target detection outputs $PE_i$ of the different CFAR detectors 24, 25, 26 at a common output PE in which all the target detection operations are merged.

As indicated here above, a circuit of this kind with a bank of polarimetrical filters is optimal for weak useful echoes and clutter with little or medium polarization. On the contrary, with highly polarized clutter, their efficiency falls. This is because the residue of clutter at output of the polarimetrical filters is very sensitive to the adjustment of the polarization of the filter on its "blind" polarization.

Figure 3:
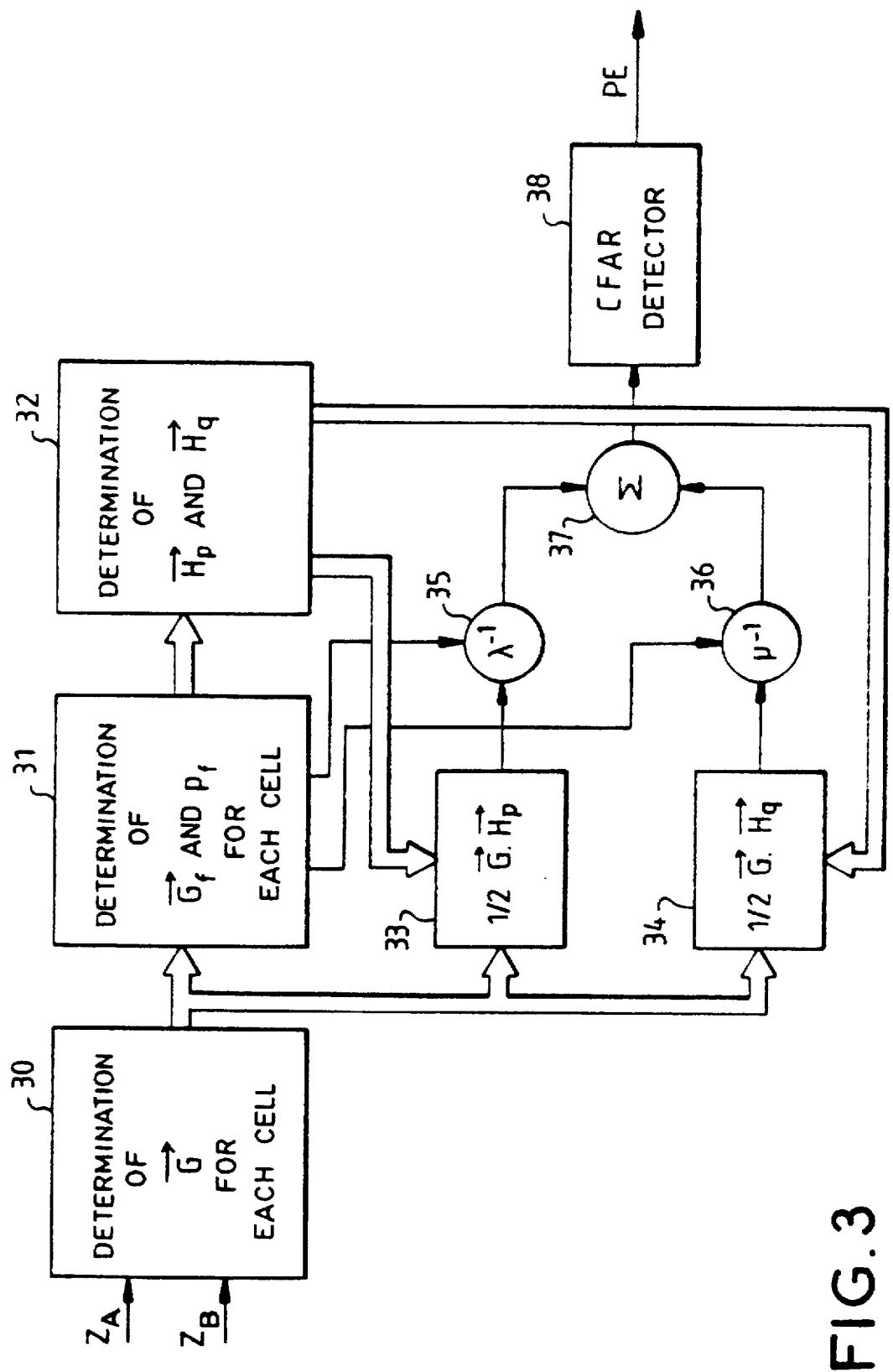
FIG. 3 gives a schematic view of another processing circuit carrying out the function of a polarimetrical CFAR detector.

The polarimetrical processing circuit of FIG. 3 fulfilling the function of a polarimetrical CFAR detector, comprises:

a circuit 30 for determining the components of the Stokes vector $\vec{G}$ for each resolution cell of the radar followed by a circuit 31 for determining the components of the Stokes vector $\vec{G}_f$ and the degree of polarization $p_f$ of the clutter surrounding each resolution cell of the radar, a cell 32 for determining the components of the unitary Stokes vectors $\vec{H}_P$ and $\vec{H}_Q$ of the polarizations parallel and orthogonal to that of the clutter;

two circuits 33, 34 for computing the scalar products ½ $\vec{G}.\vec{H}_P$ and ½$\vec{G}.\vec{H}_Q$, each followed by a weighting circuit 35, 36;

a summator circuit 37 taking the sum of the signals from the weighting circuits 35, 36 coming from the scalar product computation circuits 33, 34, and a CFAR detector 38 connected to the output of the summator circuit 37.

The circuit 30 for determining the components $[g_0, g_1, g_2, g_3]$ of the Stokes vector $\vec{G}_f$ is similar to the circuit 10 of FIG. 1 and works by means of the same relationships of definition (1).

The circuit 31 for determining the components of the Stokes vector $\vec{G}_f$ and the degree of polarization $p_f$ of the clutter surrounding each resolution cell determines the components $[g_{f0}, g_{f1}, g_{f2}, g_{f3}]$ of the Stokes vector $\vec{G}_f$ of the clutter in computing the mean components of the Stokes vectors $\vec{G}$ of the resolution cells surrounding the resolution cell considered and the degree of polarization $p_f$ of the clutter by means of the relationship of definition:

$$p_f = \sqrt{\frac{g_{f1}^2 + g_{f2}^2 + g_{f3}^2}{g_{f0}^2}}$$

The circuit 32 for determining the components of the unitary Stokes vectors $\vec{H}_P$ and $\vec{H}_Q$ of the polarizations parallel and orthogonal to that of the clutter determines the components $[1, -\alpha, -\beta, -\gamma]$ of the unitary Stokes vector $\vec{H}_P$ of the polarization of the clutter and $[1, \alpha, \beta, \gamma]$ of the unitary Stokes vector $\vec{H}_Q$ of the polarization orthogonal to that of the clutter implementing the relationship of definition:

$$\begin{cases} \alpha = -\dfrac{g_{f1}}{g_{f0} \cdot p_f} \\ \beta = -\dfrac{g_{f2}}{g_{f0} \cdot p_f} \\ \gamma = -\dfrac{g_{f3}}{g_{f0} \cdot p_f} \end{cases}$$

For each resolution cell examined, the circuit 33 for computing the scalar product ½$\vec{G}.\vec{H}_P$ delivers a real signal representing an echo energy received in a polarization parallel to that of the clutter. This signal has the value:

$$\tfrac{1}{2}\vec{G}.\vec{H}_P = g_0 - \alpha \cdot g_1 - \beta \cdot g_2 - \gamma \cdot g_3$$

For each resolution cell examined, the circuit 34 for computing the scalar product ½$\vec{G}.\vec{H}_Q$ delivers a real signal representing an echo energy received in a polarization orthogonal to that of the clutter and fulfils the role of a polarimetrical clutter-rejection filter. This signal has the value:

$$\tfrac{1}{2}\vec{G}.\vec{H}_Q = g_0 + \alpha \cdot g_1 + \beta \cdot g_2 + \gamma \cdot g_3$$

The weighting circuits 35 and 36 reduce the energy values of clutter available at output of the scalar product computing circuits 33 and 35 to the same level by multiplying the output signal of the scalar product computing circuit 33 by the coefficient:

$$\lambda^{-1} = \frac{2}{1 + p_f}$$

and the output signal of the scalar product computing circuit 34 by the coefficient:

$$\mu^{-1} = \frac{2}{1-p_f}$$

so as to return to the presence of a non-polarized process as far as the clutter is concerned.

The summator 37 adds the two signals delivered by the weighting circuits 35, 36 and applies the resultant signal to the input of the CFAR detector 38 which is of standard design. This CFAR detector 38 delivers a target detection binary signal PE at output as a function of the crossing or non-crossing of its threshold which is adjusted for a constant false alarm rate.

A polarimetrical CFAR circuit of this kind is optimal for a powerful useful echo.

The efficiency of the polarimetrical processing circuits described here above with reference to FIGS. 1 and 3 varies as a function of the signal-to-clutter ratio and the degree of polarization of the clutter.

In order to obtain optimal efficiency in every case, it is proposed here either to select the appropriate polarimetrical processing or to associate different polarimetrical processing operations by logic merger or to combine the above two types of action while at the same time limiting the increase in complexity that arises therefrom.

These associations and selections are determined according to one or more critical parameters as a function of the measured polarization of the clutter with a view to increasing the probability of detection of a useful echo.

The associations more specially envisaged relate to processing operations having different natures with definite features of complementarity such as the polarimetrical rejection filter and the polarimetrical CFAR detector. Indeed, the merging of polarimetrical processing operations of similar nature is less worthwhile: the association of a bank of polarimetrical filters and of the polarimetrical rejection filter for example would ultimately result only in a particular bank of polarimetrical filters with, admittedly, an adaptive component.

Figure 4:
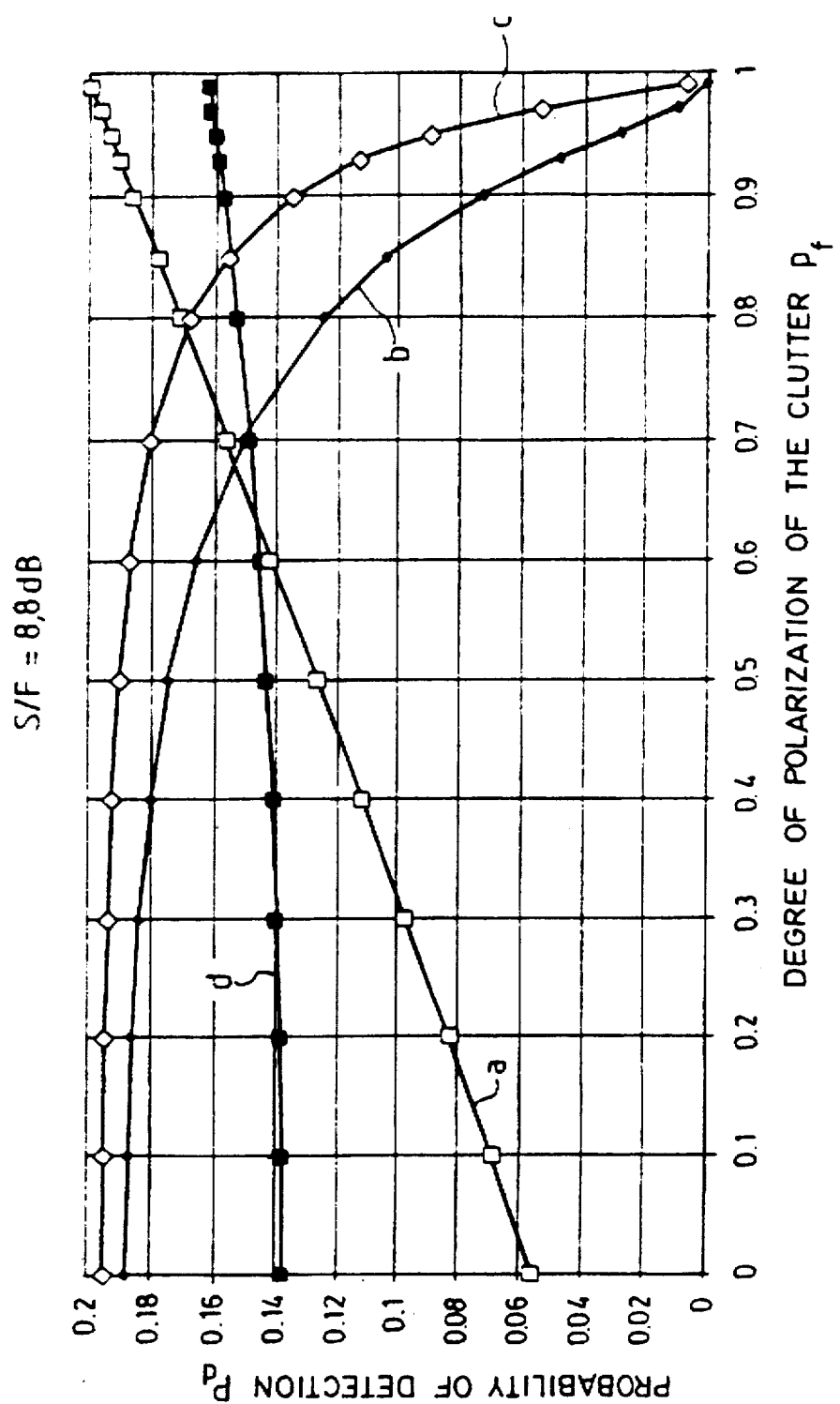
FIGS. 4 and 5 are graphs of curves of probability of detection as a function of the types of polarimetrical processing.
Figure 5:
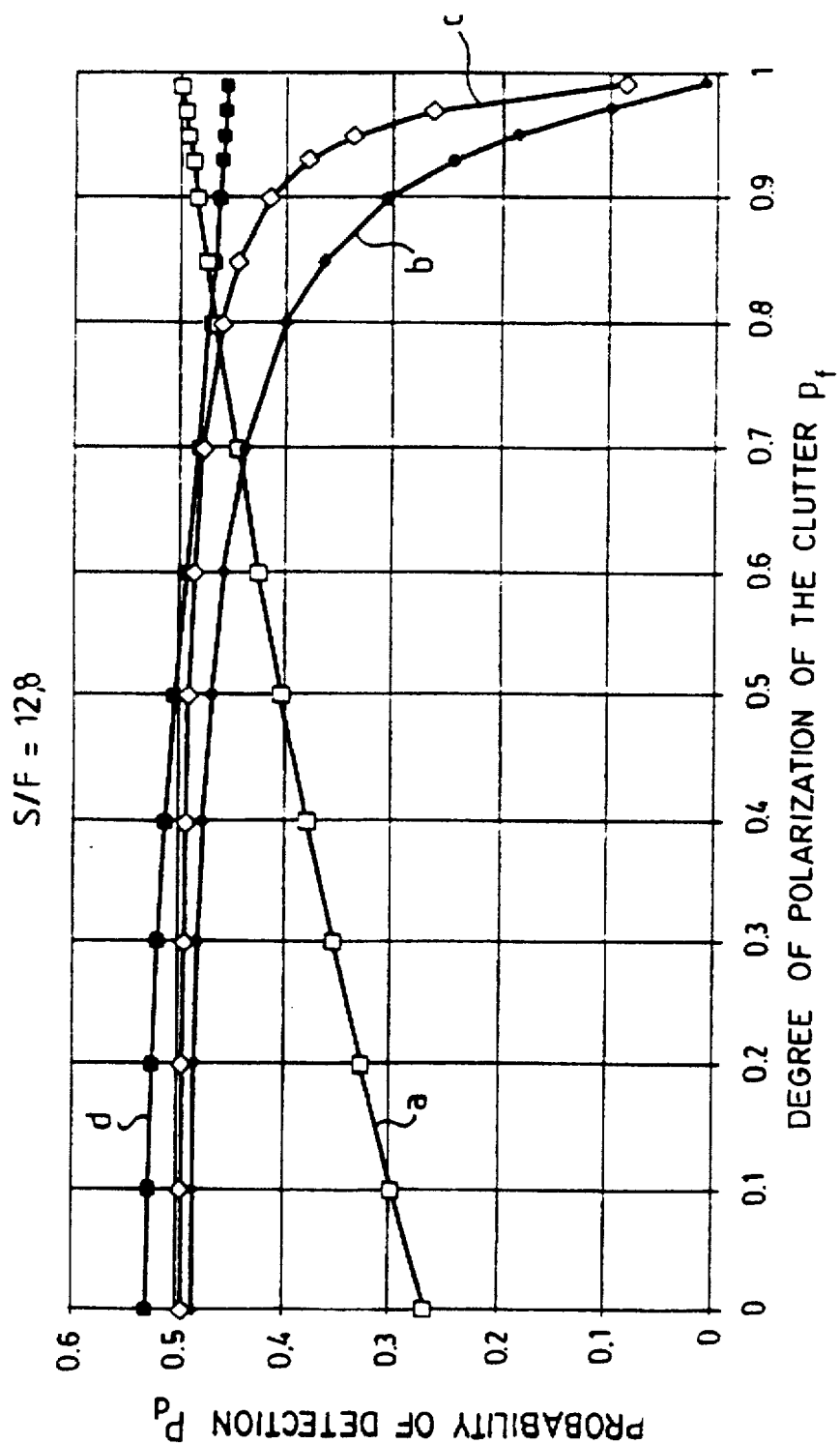

The graphs of curves of FIGS. 4 and 5 provide a glimpse of the complementary features of the different polarimetrical processing operations. They are plotted for Gaussian signals and for a useful signal that is non-polarized or that has a polarization unknown in principle as is the case for a radar with circularly polarized emission and for a probability of false alarm of $10^{-6}$.

The curves represent, as a function of the degree $p_f$ of polarization of the clutter, the probability of detection Pd of the different polarimetrical processing operations. They are indexed by "a" for the polarimetrical rejection filter, "b" for a bank of twelve polarimetrical filters with evenly distributed polarizations on the Poincaré sphere of polarizations, "c" for a bank of thirty-two polarimetrical filters with evenly distributed polarizations on the Poincaré sphere and "d" for the polarimetrical CFAR detector.

The graph of the curves of FIG. 4 is plotted for a low signal-to-noise ratio equal to 8.8 dB. It shows that, in this case, the banks of polarimetrical filters are at their most efficient over a wide range of degrees of polarization of the clutter but that the polarimetrical rejection filter ultimately proves to be more efficient beyond a degree of polarization of clutter $p_f$ of 0.8. The fact that the polarimetrical CFAR detector is systematically inferior to approaches based on polarimetrical filters can also be seen.

The graph of the curves of FIG. 5 is plotted for a mean signal-to-clutter ratio equal to 12.8 dB corresponding to the conventional limits of the radar range. It shows that, in this case, the greatest efficiency is obtained with the polarimetrical CFAR detector for a degree of polarization of the clutter $p_f$ below 0.824 and that, beyond this value, the greatest efficiency is obtained with a polarimetrical rejection filter.

It can also be seen, in the graphs of FIGS. 4 and 5, by comparing the curves a and b, that the efficiency of the bank of twelve polarimetrical filters is greater than that of the polarimetrical rejection filter below a degree of polarization of the clutter $p_f$ having a value in the range of 0.68.

To derive advantage from these observations, there is proposed a polarimetrical processing operation in which the polarimetrical CFAR detector is used in parallel either with the bank of polarimetrical filters if the degree of polarization of the clutter is below a threshold set within a bracket ranging from 0.6 to 0.8 and preferably at 0.68 for a bank of polarimetrical filters having an average size of ten to fifteen filters or with the polarimetrical rejection filter if the degree of polarization of the clutter exceeds this threshold.

Figure 6:
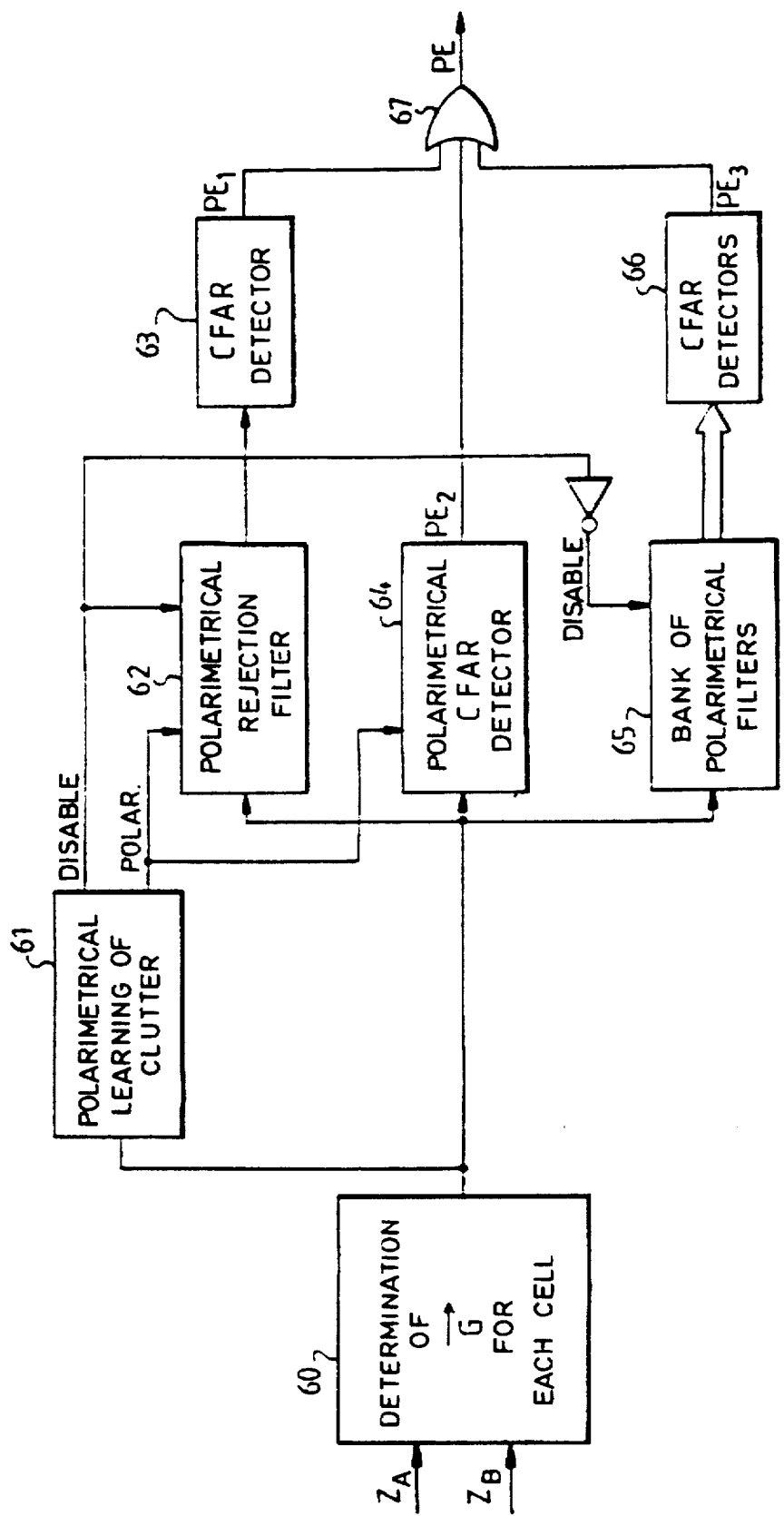
FIG. 6 gives a schematic view of a polarimetrical processing circuit according to the invention.

FIG. 6 gives a schematic view of an exemplary implementation of a polarimetrical processing operation of this kind. The figure shows: a circuit 60 for determining the components of the Stokes vector $\vec{G}$ for each resolution cell of the radar, a circuit 61 for the polarimetrical learning of the clutter, a polarimetrical rejection filter 62 associated with a CFAR detector 63 and a polarimetrical CFAR detector 64 driven by a "polar" command of the polarimetrical clutter-learning circuit 61, a bank 65 of polarimetrical filters associated with CFAR detectors 66 and activated or disabled in opposition with the polarimetrical rejection filter 62 by a "disable" signal of the polarimetrical learning circuit 61 and an "OR" type logic circuit 67 bringing together the target detection output $PE_1$ of the CFAR detector 63 placed downline with respect to the polarimetrical rejection filter 62, the target detection output $PE_2$ of the polarimetrical CFAR detector 64 and the target detection output $PE_3$ of the CFAR detectors 66 placed downline with respect to the polarimetrical filters of the bank 65 and a common target detection output PE.

The circuit 60 for determining the components [$g_0$, $g_1$, $g_2$, $g_3$] of the Stokes vector $\vec{G}$ for each resolution cell of the radar, which is placed at the head, is similar to the circuit 10 of FIG. 1 and works by means of the same relationships of definition (1).

The polarimetrical learning circuit 61 comprises:

a circuit for determining the components of the Stokes vector $\vec{G}_f$ of the clutter common with the polarimetrical rejection filter 62 and the polarimetrical CFAR detector 63 which is similar to the filter 11 of the polarimetrical rejection filter processing circuit of FIG. 1 (this circuit for determining the components of the Stokes vector $\vec{G}_f$ of the clutter delivers the components of the Stokes vector $\vec{G}_f$ of the clutter by way of a "polar" command), a circuit for determining the degree of polarization $p_f$ of the clutter placed after the circuit for determining the components of the Stokes vector $\vec{G}_f$ of the clutter, and a threshold circuit generating the disabling order "disable" depending on whether or not the degree of polarization of the clutter $p_f$ crosses a fixed triggering threshold in the vicinity of the value 0.68.

The polarimetrical rejection filter 62 associated with the CFAR detector 63 has a constitution similar to that of the polarimetrical processing circuit with polarimetrical rejection filter of FIG. 1 except for the following points: firstly it shares its circuit for determining the components of the Stokes vector $\vec{G}$ of the resolution cells of the radar with the polarimetrical clutter-learning circuit 61, the polarimetrical CFAR detector 64 and the bank of polarimetrical filters 65; secondly, it shares its circuit for determining the components of the Stokes vector $\vec{G}_f$ of the clutter with the polarimetrical clutter-learning circuit 61 and the polarimetrical CFAR detector 64; thirdly it shares its circuit for determining the components of the unitary Stokes vector $\vec{H}_O$ of polarization orthogonal to that of the clutter with the polarimetrical CFAR detector 64; fourthly its circuit for computing the polar product is provided with a disabling command placing its output at the level zero when the disabling signal generated by the polarization clutter-learning circuit 61 corresponds to a degree of polarization of the clutter $p_f$ below the triggering threshold.

The polarimetrical CFAR detector 64 has a constitution similar to that of the polarimetrical processing circuit of FIG. 3 fulfilling the polarimetrical CFAR function except for the fact that it shares some of its elements with a polarimetrical clutter learning circuit 61, the polarimetrical rejection filter 62 and the bank of polarimetrical filters 65.

The bank of polarimetrical filters 65 associated with the CFAR detectors 66 has a constitution similar to that of the polarimetrical processing circuit of FIG. 2 fulfilling the function of a bank of polarimetrical filters except for the following points: firstly, it shares its circuit for the determining of the components of the Stokes vector $\vec{G}$ of the resolution cells of the radar with the polarimetrical clutter-learning 61, the polarimetrical rejection filter 62 and the polarimetrical CFAR detector 64; secondly its scalar product computing circuits are provided with an disabling command placing their output at the level zero when the disabling signal "disable" generated by the polarimetrical clutter-learning circuit 61 corresponds to a degree of polarization of the clutter $p_f$ greater than the triggering threshold The polarimetrical processing circuit of FIG. 6 can be used to derive the benefit of the advantages proper to the polarimetrical CFAR detector, the polarimetrical rejection filter and the bank of polarimetrical filters taken separately, namely the absence of "blind" polarization of the polarimetrical CFAR detector, the optimal character of the polarimetrical CFAR detector for the powerful useful echoes, the optimal character of the polarimetrical rejection filter in the case of highly polarized clutter, and the optimal character of the bank of polarimetrical filters for the weak useful echoes and the clutter with low or medium polarization.

The fact of associating a polarimetrical CFAR detector, a polarimetrical rejection filter and a bank of polarimetrical filters in one and the same polarimetrical processing circuit entails only a small increase in the computational load of the signal processor of the radar. Indeed, the essential part of this load can be attributed to the estimation of the polarimetrical values of the clutter surrounding the resolution cell being tested, and this estimation is common to the polarimetrical CFAR detector and to a polarimetrical rejection filter.

A polarimetrical processing circuit of this kind associating the polarimetrical CFAR detector, the rejection polarimetrical filter and the bank of polarimetrical filters can be used with radars having polarization agility. This is useful above all for the recognition function but also has advantages in terms of detection. The volume of the processing operation then increases in substantial proportions since the number of channels available goes from two to three and four respectively in the monostatic and bistatic cases corresponding to vector environments (clutter polarization) with a dimension of 6 or 10 instead of 3. Nevertheless, the different principles of polarimetrical processing envisaged and, with them, the configurations of association and selection described can be extended naturally to other uses. The criteria of choice however become inevitably more complex if only because of the effect of the polarization sent out on the degree of polarization of the clutter.

This polarimetrical processing circuit associating the polarimetrical CFAR detector, the polarimetrical rejection filter and the polarimetrical filter bank may be placed in any surveillance radar working from any platform, whether or not on the ground, for example for air traffic control.

The radar polarimetry substantially increases the visibility of the targets whether they are submerged in clutter or are clutter-free. The result thereof is that the wave shapes and the frequency processing operations become lighter. This has the beneficial consequence wherein it becomes possible to use the radar for other tasks during the time thus released.

What is claimed is:

1. A target detection polarimetrical processing circuit for radar receivers comprising at least, in parallel, a polarimetrical CFAR detector provided with a target detection output and a polarimetrical clutter-rejection filter associated with a separate CFAR detector provided with a target detection output, and an "OR" type logic circuit combining the target detection outputs of the polarimetrical CFAR detector and of the separate CFAR detector placed after the polarimetrical rejection filter.

2. A circuit according to claim 1 comprising, in parallel, said polarimetrical CFAR detector provided with a target detection output, said polarimetrical clutter-rejection filter associated with a CFAR detector provided with a target detection output and a bank of polarimetrical filters associated with CFAR detectors provided with target detection outputs, and an "OR" type logic circuit combining the different target detection outputs.

3. A circuit according to claim 2, further comprising a selection circuit activating the polarimetrical clutter-rejection filter and disabling the bank of polarimetrical filters when the degree of polarization of the clutter exceeds a certain threshold and conversely disabling the polarimetrical clutter-rejection filter and activating the bank of polarimetrical filters when the degree of polarization of the clutter is below said threshold.

4. A circuit according to claim 3, wherein said threshold is chosen in a bracket of degrees of polarization of the clutter ranging from 0.6 to 0.8.

5. A circuit according to claim 4, wherein said threshold is chosen to be equal to a degree of polarization of the clutter equal to 0.68.

* * * * *